United States Patent [19]
Ho

[11] Patent Number: 5,982,885
[45] Date of Patent: Nov. 9, 1999

[54] PORTABLE TELEPHONE HOLDER

[76] Inventor: Wun-Shing Ho, 148, Sec. 2, Zhuang Jing Rd., Taoyuan City, Taiwan

[21] Appl. No.: 09/005,490

[22] Filed: Jan. 12, 1998

[51] Int. Cl.⁶ ..................................... H04M 1/00
[52] U.S. Cl. ........................... 379/446; 379/455
[58] Field of Search .................... 379/446, 455, 379/426, 454, 449

[56] References Cited

U.S. PATENT DOCUMENTS

| | | | |
|---|---|---|---|
| 5,555,302 | 9/1996 | Wang | 379/446 |
| 5,615,258 | 3/1997 | Ho | 379/446 |
| 5,694,468 | 12/1997 | Hsu | 379/446 |

*Primary Examiner*—Jack Chiang
*Attorney, Agent, or Firm*—Alan Kamrath; Oppenheimer, Wolff & Donnelly, LLP

[57] ABSTRACT

A portable telephone holder has a base seat, a cover covering the base seat, a left and a right lateral clamp devices disposed at two sides of the cover, a positioning seat disposed on a bottom of the cover, a first and a second coupling sliders disposed between the cover and the base seat, and a left upper, a left lower, a right upper and a right lower rubber sleeves disposed on the cover.

3 Claims, 4 Drawing Sheets

PORTABLE TELEPHONE HOLDER

BACKGROUND OF THE INVENTION

The invention relates to a portable telephone holder. More particularly, the invention relates to a portable telephone holder which has a simple mechanism to clamp a portable telephone.

U.S. Pat. No. 5,615,258 has disclosed a portable telephone holder which comprises a bottom plate, a cover covering the bottom plate, two lateral flaps disposed at two sides of the cover, a bottom block disposed beneath the cover, two coupling sliders disposed in the cover, two plastic casings disposed on the bottom block, and four rubber sleeves disposed on the cover. However, the portable telephone holder has some disadvantages. The lateral flaps move slowly. The portable telephone may be engaged with the rubber sleeves so that it is difficult to remove the portable telephone from the portable telephone holder.

SUMMARY OF THE INVENTION

An object of the invention is to provide a portable telephone holder which has a simple mechanism to clamp a portable telephone.

Accordingly, a portable telephone holder comprises a base seat, a cover covering the base seat, a left and a right lateral clamp devices disposed at two sides of the cover, a positioning seat disposed on a bottom of the cover, a first and a second coupling sliders disposed between the cover and the base seat, and a left upper, a left lower, a right upper and a right lower rubber sleeves disposed on the cover. The base seat has a round hole, a corrugated plate, a periphery flange, an upper interior, and a bottom spacing. A first and a second lateral notches are formed on a left and a right periphery rim of the cover. The cover has a lower interior, and a bottom channel. Each of the first and the second coupling sliders has a serration plate, a slot formed in the serration plate, a hollow post having a center hole and a terminal notch, and a protruded bar disposed on a lower portion of the hollow post. Each of the left and the right lateral clamp devices has a clamp seat, a guide plate, a hollow column, a blind hole, a groove, and two rods. The positioning seat has a slide block and a plurality of apertures. A first and a second levers are disposed on the positioning seat via the respective apertures. A first and a second plastic casings enclose the respective levers. Each of the rubber sleeves encloses the respective rod. Each hollow post is inserted in the respective hollow column. A stud is disposed on the cover. The stud is inserted through the slots and the round hole.

DETAILED DESCRIPTION OF THE INVENTION

Figure 1:
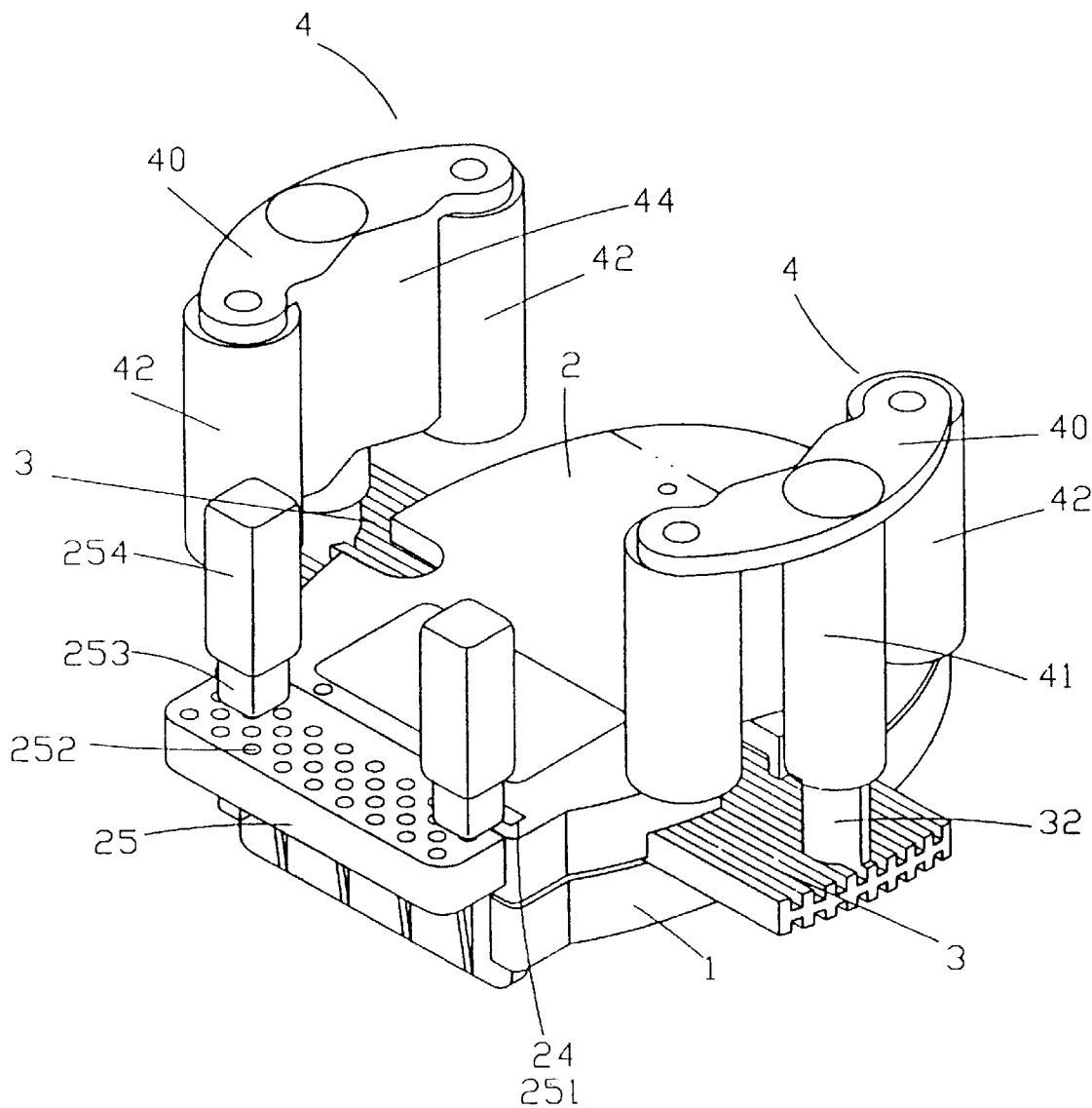
FIG. 1 is a perspective assembly view of a portable telephone holder of a preferred embodiment in accordance with the invention.
Figure 2:
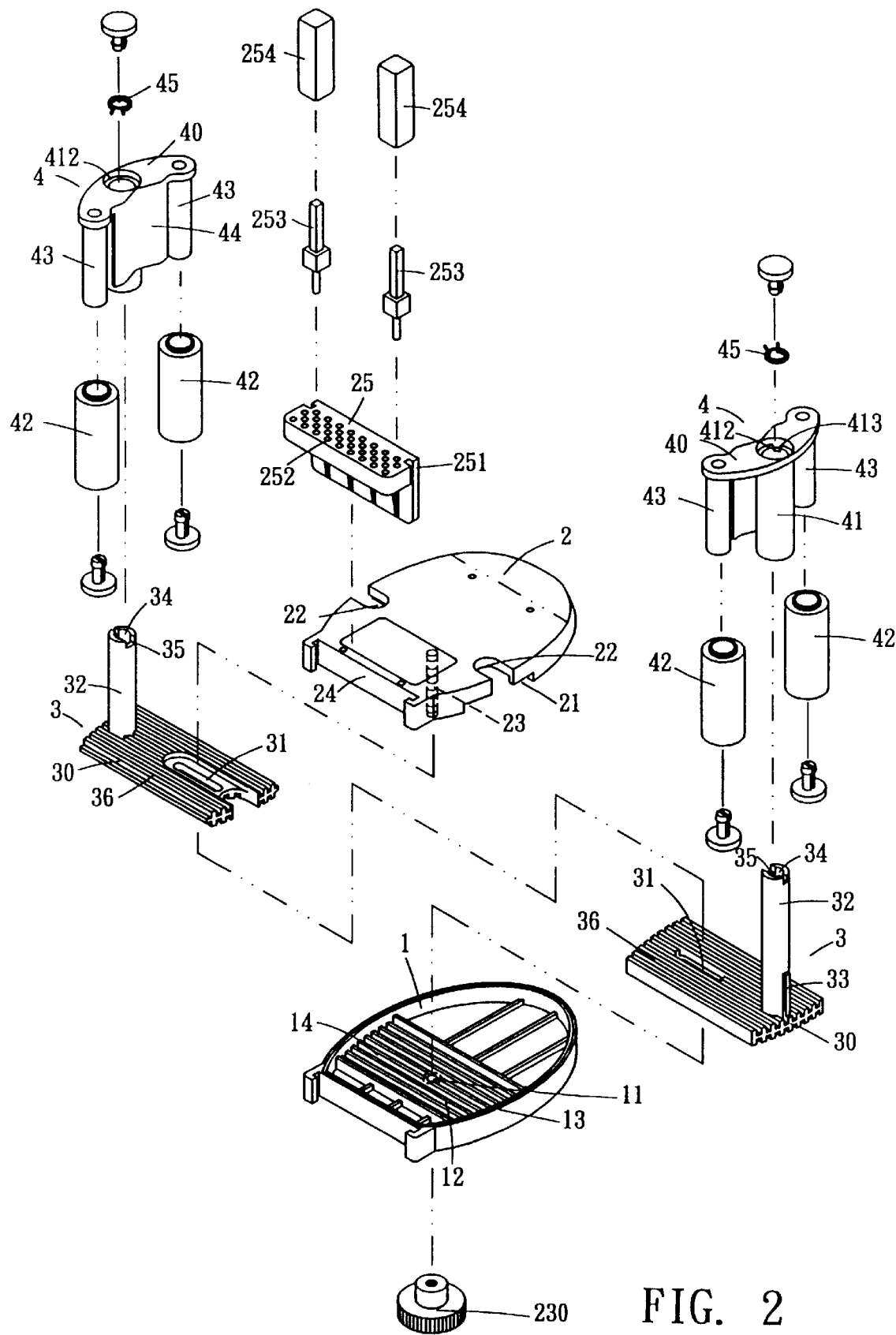
FIG. 2 is a perspective exploded view of FIG. 1.
Figure 3:
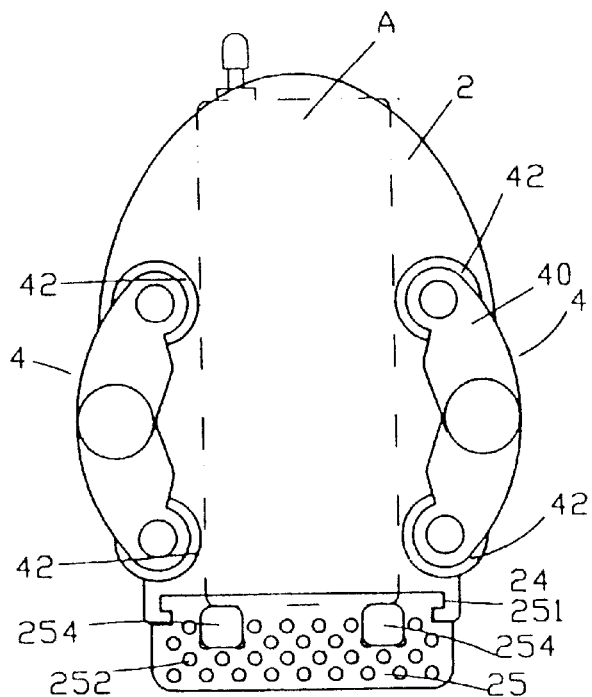
FIG. 3 is a schematic view illustrating a portable telephone holder clamping a portable telephone.

Referring to FIGS. 1 to 3, a portable telephone holder comprises a base seat 1, a cover 2 covering the base seat 1, a left and a right lateral clamp devices 4 disposed at two sides of the cover 2, a positioning seat 25 disposed on a bottom of the cover 2, a first and a second coupling sliders 3 disposed between the cover 2 and the base seat 1, and a left upper, a left lower, a right upper and a right lower rubber sleeves 42 disposed on the cover 2.

The base seat 1 has a round hole 11, a corrugated plate 12, a periphery flange 13, an upper interior 14, and a bottom spacing 15.

A first and a second lateral notches 22 are formed on a left and a right periphery rim of the cover 2. The cover 2 has a lower interior 21, and a bottom channel 24.

Each of the first and the second coupling sliders 3 has a serration plate 30, a slot 31 formed in the serration plate 30, a hollow post 32 having a center hole 34 and a terminal notch 35, and a protruded bar 33 disposed on a lower portion of the hollow post 32.

Each of the left and the right lateral clamp devices 4 has a clamp seat 40, a guide plate 44, a hollow column 41, a blind hole 412, a groove 413, and two rods 43.

The positioning seat 25 has a slide block 251 and a plurality of apertures 252. A first and a second levers 253 are disposed on the positioning seat 25 via the respective apertures 252. A first and a second plastic casings 254 enclose the respective levers 253.

Each of the rubber sleeves 42 encloses the respective rod 43.

Each hollow post 32 is inserted in the respective hollow column 41.

A stud 23 is disposed on the cover 2. The stud 23 is inserted through the slots 31 and the round hole 11.

Each blind hole 412 receives an elastic ring 45.

A nut 230 engages with the stud 23.

Figure 4:
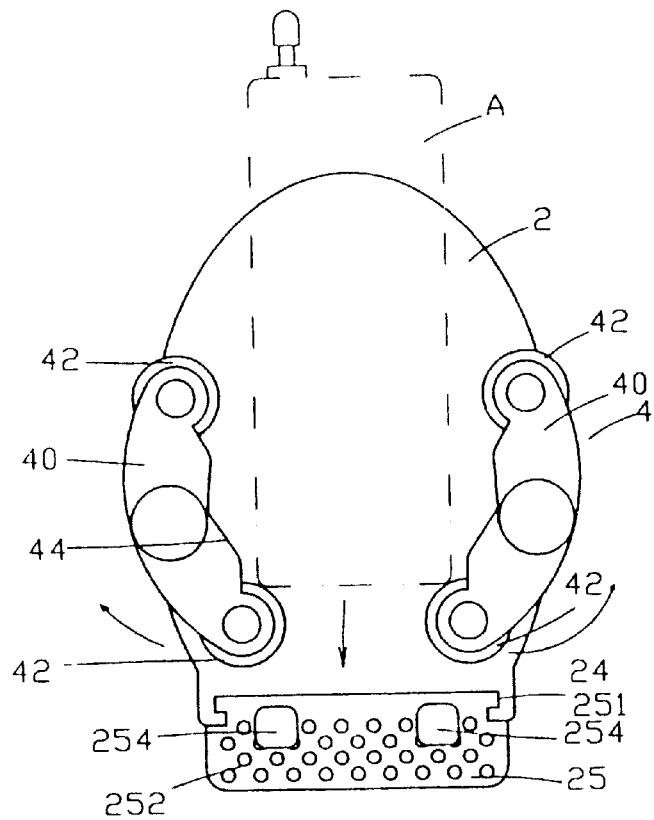
FIG. 4 is a schematic view illustrating a portable telephone releasing from a portable telephone holder.
Figure 5:
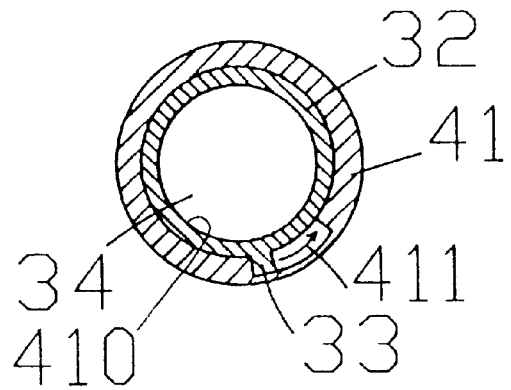
FIG. 5 is a sectional view of a hollow post, a protruded bar, and a sleeve.
Figure 6:
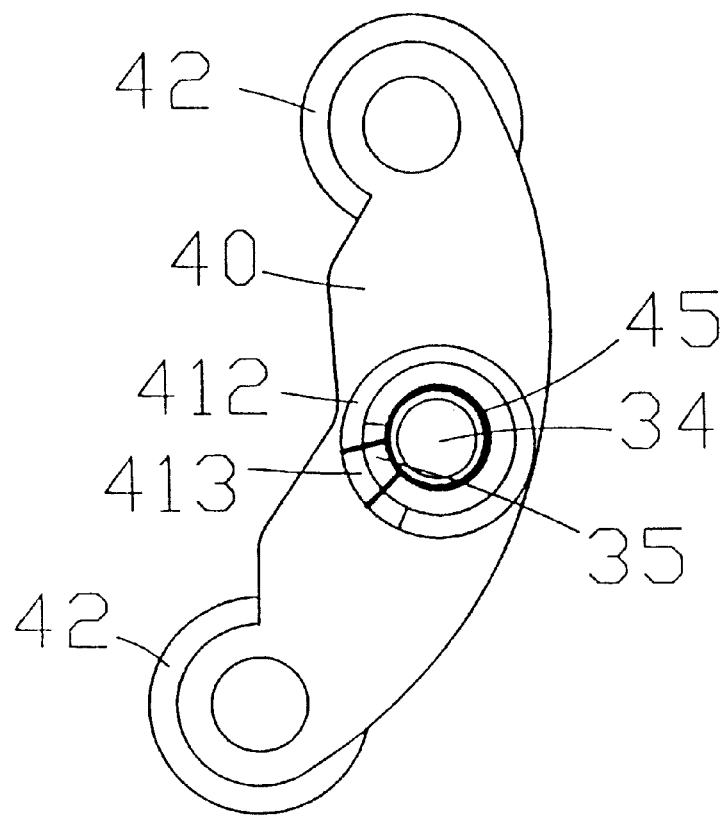
FIG. 6 is a schematic view illustrating a slider engaging with a clamp device.

Referring to FIGS. 4 to 6, each of the rubber sleeves 42 has a recess hole 410 receiving the respective hollow post 32 and a periphery notch 411 receiving the respective protruded bar 33. A portable telephone A is clamped by the left and the right lateral clamp devices 4.

The invention is not limited to the above embodiment but various modification thereof may be made. Further, various changes in form and detail may be made without departing from the scope of the invention.

I claim:

1. A portable telephone holder comprises:

a base seat, a cover covering the base seat, a left and a right lateral clamp devices disposed at two sides of the cover, a positioning seat disposed on a bottom of the cover, a first and a second coupling sliders disposed between the cover and the base seat, and a left upper, a left lower, a right upper and a right lower rubber sleeves disposed on the cover, the base seat having a round hole, a corrugated plate, a periphery flange, an upper interior, and a bottom spacing, a first and a second lateral notches formed on a left and a right periphery rim of the cover, the cover having a lower interior and a bottom channel, each of the first and the second coupling sliders having a serration plate, a slot formed in the serration plate, a hollow post having a center hole and a terminal notch, and a protruded bar disposed on a lower portion of the hollow post, each of the left and the right lateral clamp devices having a clamp seat, a guide plate, a hollow column, a blind hole, a groove, and two rods, the positioning seat having a slide block and a plurality of apertures, a first and a second levers disposed on the positioning seat via the respective apertures, a first and a second plastic casings enclosing the respective levers, each of the rubber sleeves enclosing the respective rod, each said hollow post inserted in the respective hollow column, a stud disposed on the cover, and the stud inserted through the slots and the round hole.

2. A portable telephone holder as claimed in claim 1, wherein each said blind hole receives an elastic ring.

3. A portable telephone holder as claimed in claim 1, wherein a nut engages with the stud.

\* \* \* \* \*